UNITED STATES PATENT OFFICE.

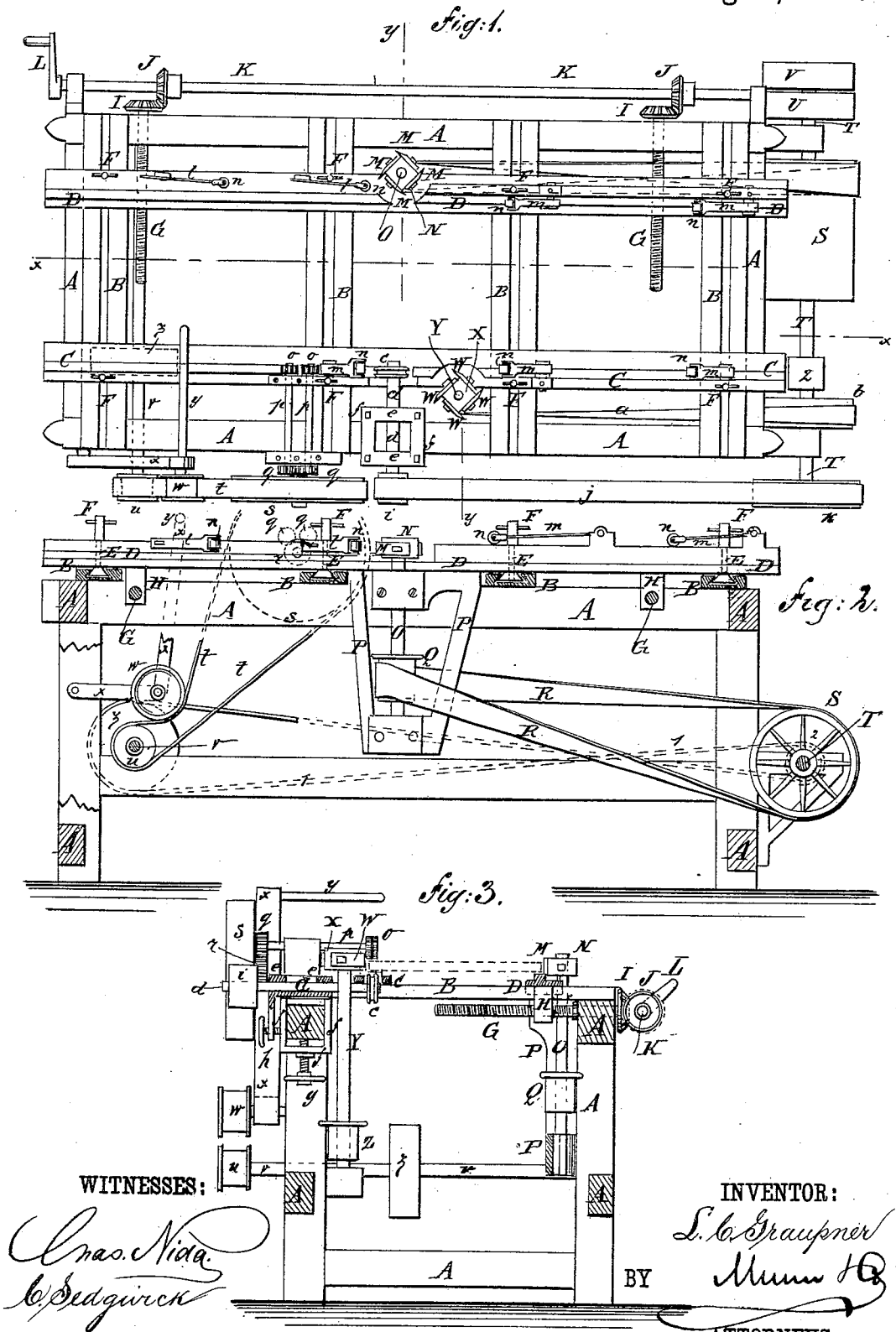

LOUIS C. GRAUPNER, OF RED BLUFF, CALIFORNIA.

BLIND-FINISHING MACHINE.

SPECIFICATION forming part of Letters Patent No. 245,481, dated August 9, 1881.

Application filed June 2, 1881. (No model.)

*To all whom it may concern:*

Be it known that I, LOUIS CARL GRAUPNER, of Red Bluff, in the county of Tehama and State of California, have invented a new and useful Improvement in Blind-Finishing Machines, of which the following is a full, clear, and exact description.

In the accompanying drawings, Figure 1 is a plan view of my improvement. Fig. 2 is a sectional side elevation of the same, taken through the line $x\,x$, Fig. 1. Fig. 3 is a sectional end elevation of the same, taken through the line $y\,y$, Fig. 1.

Similar letters of reference indicate corresponding parts.

The object of the invention is to facilitate the finishing of blinds and promote accuracy in the finished blinds.

A represents the frame of the machine. To the top of the frame A are attached cross-bars B, in the upper sides of which are formed dovetailed grooves to receive dovetailed strips attached to the guides C D, so that the guide D can be moved toward or from the guide C, as the width of the blinds may require. The guides C D are secured in place upon the cross-bars B by screws E and hand-nuts F. The heads of the screws E fit into the dovetailed grooves of the cross-bars B, so that the guides C D will be firmly clamped to the said cross-bars B by tightening the nuts F.

To the side bar of the frame A are swiveled screws G, which pass through screw-holes in the nuts H attached to the guide D.

To the outer ends of the screws G are attached beveled-gear wheels I, the teeth of which mesh into the teeth of beveled-gear wheels J attached to the shaft K. The shaft K revolves in bearings attached to the frame A, and to one of its ends is attached a crank, L. With this construction, by turning the crank L in one or the other direction the guide D can be moved in or out, as the width of the blinds may require.

The edge of the blind is jointed by the cutters M, attached to the cutter-head N, which is attached to the upper end of the mandrel O. The mandrel O revolves in bearings attached to a hanging frame, P, secured at its upper end to the guide D. To the mandrel O is attached a pulley, Q, to receive a band, R, which also passes around a long pulley, S, attached to the shaft T. With this construction the cutter-head N and its mandrel O will be carried with the guide D as the said guide is adjusted, so that the cutter-head will always be in position for work. The shaft T revolves in bearings attached to the end of the frame A, and to one end of the said shaft T is attached a fast pulley, U, and a loose pulley, V, to receive the driving-belt. The other edge of the blind is rabbeted by the cutters W, attached to the cutter-head X, which is attached to the upper end of the mandrel Y. The mandrel Y revolves in bearings attached to the frame A, and to it is attached a pulley, Z, to receive the band $a$, which also passes around a pulley, $b$, attached to the shaft T.

At a little distance from the rabbeting cutter-head X is placed a cutter-head, $c$, for forming a bead upon the blind-stile. The cutter-head $c$ is attached to a horizontal mandrel, $d$, which revolves in bearings $e$, placed in a small frame, $f$. The frame $f$ passes around a side bar of the frame A. Through the bottom bar or plate of the frame $f$ passes a set-screw, $g$, which rests against the lower side of the side bar of the frame A, so that the frame $f$, and with it the bearings $e$ and mandrel $d$, can be raised and lowered by turning the screw $g$, to adjust the beading-head $c$ to cut a deeper or shallower bead, as may be required.

With the bearings $e$, or an arm attached to or formed upon the said bearings and with the frame $f$, is connected a set-screw, $h$, so that the bearings $e$ and mandrel $d$ can be moved in or out to adjust the beading-head laterally to form the bead in proper position upon the blind-stile.

To the outer end of the mandrel $d$ is attached a pulley, $i$, to receive the belt $j$, which passes around a pulley, $k$, attached to the shaft T, for driving the cutter-head $c$.

To the guide D are attached springs $l$ to hold the blind against the guide C while passing to the cutters; and to the guides C D are attached springs $m$, to hold the blind down upon the guides C D while passing from the cutters. The springs $l\,m$ can have rollers $n$ pivoted to their free ends, to prevent friction between the blinds and the said springs; but the said rollers are not essential.

The blinds are fed to the cutters with a uniform movement by feed-rollers $o$, attached to the inner ends of two parallel shafts, P, which revolve in bearings attached to the guide C and to the frame A. To the outer ends of the shafts P are attached gear-wheels $q$, the teeth of which mesh into the teeth of a third gear-wheel, $r$, placed beneath the space between the said gear-wheels $q$, so that the two feed-rollers $o$ will be driven in the same direction. The gear-wheel $r$ is pivoted to the frame A, and to the outer end of its journal is attached a pulley, $s$, around which passes a belt, $t$. The belt $t$ also passes around a pulley, $u$, attached to the shaft $v$, which revolves in bearings attached to the frame A. The belt $t$ is put on loose, and is tightened by a pulley, $w$, pivoted to the angle of an angled lever, $x$, the lower end of which is pivoted to the frame A. The upper arm of the lever $x$ projects into such a position that it can be conveniently reached and operated by the attendant.

To the upper end of the lever $x$ is attached a handle or round, $y$, which projects over the machine for convenience in operating the said lever. With this construction the attendant, by giving less or more tautness to the belt $t$, can regulate the feed of the blinds to the cutters as circumstances may require.

To the shaft $v$ is also attached a pulley, $z$, around which passes a belt, 1. The belt 1 also passes around a pulley, 2, attached to the shaft T, so that the shaft $v$ will be driven from the said shaft T.

With this construction the machine will bead, rabbet, and joint blinds rapidly and accurately, leaving the side edges of the blind parallel, and can be readily adjusted to operate upon outside blinds or upon inside blinds, rabbeting both edges, or rabbeting one edge and making the other edge knuckle-jointed or of any other desired shape.

Having thus fully described my invention, what I claim as new, and desire to secure by Letters Patent, is—

The combination, with the mandrel O, having a head with cutters M, and the guide D, of an intermediate hanging frame, P, secured at its upper end to the guide, as shown and described.

LOUIS CARL GRAUPNER.

Witnesses:
JOSEPH KNIGHT,
C. E. TINKHAM.